Dec. 19, 1961 D. H. SHEPARD ET AL 3,013,718

APPARATUS FOR CHECKING ACCURACY OF AUTOMATIC CHARACTER READINGS

Filed Feb. 8, 1956 3 Sheets-Sheet 1

INVENTORS
David H. Shepard and
Pickard F. Bargh
BY
Mason, Fenwick & Lawrence
ATTORNEYS

APPARATUS FOR CHECKING ACCURACY OF AUTOMATIC CHARACTER READINGS

Filed Feb. 8, 1956

INVENTORS
David H. Shepard
and Pickard F. Bargh

BY Mason, Fenwick & Lawrence
ATTORNEYS

Dec. 19, 1961 D. H. SHEPARD ET AL 3,013,718

APPARATUS FOR CHECKING ACCURACY OF AUTOMATIC CHARACTER READINGS

Filed Feb. 8, 1956 3 Sheets-Sheet 3

INVENTORS
David H. Shepard
and Pickard F. Bargh

BY Mason, Fenwick & Lawrence
ATTORNEYS

United States Patent Office 3,013,718

Patented Dec. 19, 1961

3,013,718

APPARATUS FOR CHECKING ACCURACY OF AUTOMATIC CHARACTER READINGS

David H. Shepard, Falls Church, and Pickard F. Bargh, Springfield, Va., assignors to Intelligent Machines Research Corporation, Arlington, Va., a corporation of Maryland Filed Feb. 8, 1956, Ser. No. 564,278
20 Claims. (Cl. 235—61.7)

The present invention relates in general to checking apparatus, and more particularly to apparatus for automatically checking the accuracy of automatic character sensing equipment employed to read serial numbers and other character groups and emit an error signal if a serial number or character group is read incorrectly by the character sensing apparatus.

Heretofore, automatic character sensing apparatus has been devised for producing output signals identifying characters or numbers sensed by the apparatus. Examples of such apparatus are those disclosed in U.S. Patent No. 2,663,658 granted December 22, 1953 to David H. Shepard and the copending patent application of David H. Shepard, Serial No. 399,227, filed December 17, 1953, now Patent No. 2,897,481, entitled Apparatus For Reading. While it is possible to achieve a very high degree of accuracy in the reading of serial numbers or characters by automatic character sensing apparatus alone, it is often more practical, in certain applications, where verification of accuracy is required or where the numbers or characters to be read are subject to deterioration or interference, to provide for independent checking of reading of the automatic character sensing apparatus. The primary reason for this in such latter applications is that the numbers or characters to be read are subject to a substantial variation in the quality of the character representation, ranging from perfectly formed characters to those in which portions are missing, are faint, or filled in. An attempt to read the worst of such material would require an unreasonably expensive and complex character sensing apparatus.

A more practical approach would be to ignore the very small percentage of the material which is particularly difficult to read and may lead to ambiguous or erroneous results. This may be achieved so long as the material then read incorrectly is rejected rather than passed undetected through the character sensing apparatus. To accomplish this, the provision must be made for serial number checking apparatus which will detect reading errors by the character sensing apparatus and reject or distinctively identify the material from which the reading errors were made so that they can be handled manually.

A checking scheme employed to check the accuracy of numbers read by automatic character sensing apparatus need not be concerned about transposition errors, since transposition errors do not occur in the operation of such apparatus. Hence, except for the rare occurrence of a plurality of compensating errors in the reading of a single serial number of such character that the errors balance out to produce an apparent correct result, reading errors can be detected by a scheme which checks the sum of all digits in each number. A high degree of accuracy in the checking operation can be achieved by merely requiring this sum to differ by a fixed amount from a preselected modulus or reference number, or a multiple thereof.

An object of the present invention, therefore, is the provision of novel apparatus especially adapted for checking the accuracy of a group of numbers or characters read by automatic character sensing apparatus and producing an error signal upon occurrence of any error in the reading of the numbers or characters.

Another object of the present invention is the provision of novel apparatus for checking serial numbers and like multicharacter characters stored or present in automatic character sensing equipment, wherein individual digit comparison is dispensed with and no operators are required to introduce comparison data into the checking apparatus in connection with the checking function.

Another object of the present invention is the provision of novel apparatus for checking serial numbers read by automatic character sensing equipment wherein reading errors are detected before the output of the character sensing equipment is applied to output recording devices and erroneously read serial numbers are rendered incapable of actuating the output recording device so that only correct information is recorded.

Another object of the present invention is the provision of novel apparatus for checking serial numbers read from documents by automatic character sensing equipment, wherein the sum of the digits making up each serial number is stored in the sensing equipment and the document is rejected whenever the sum seems to differ by a fixed amount from a preselected reference number, or a multiple thereof.

Other objects, advantages and capabilities of the present invention will become apparent from the following detail description, taken in conjunction with the accompanying drawing, showing one preferred embodiment of the invention.

Figure 1:
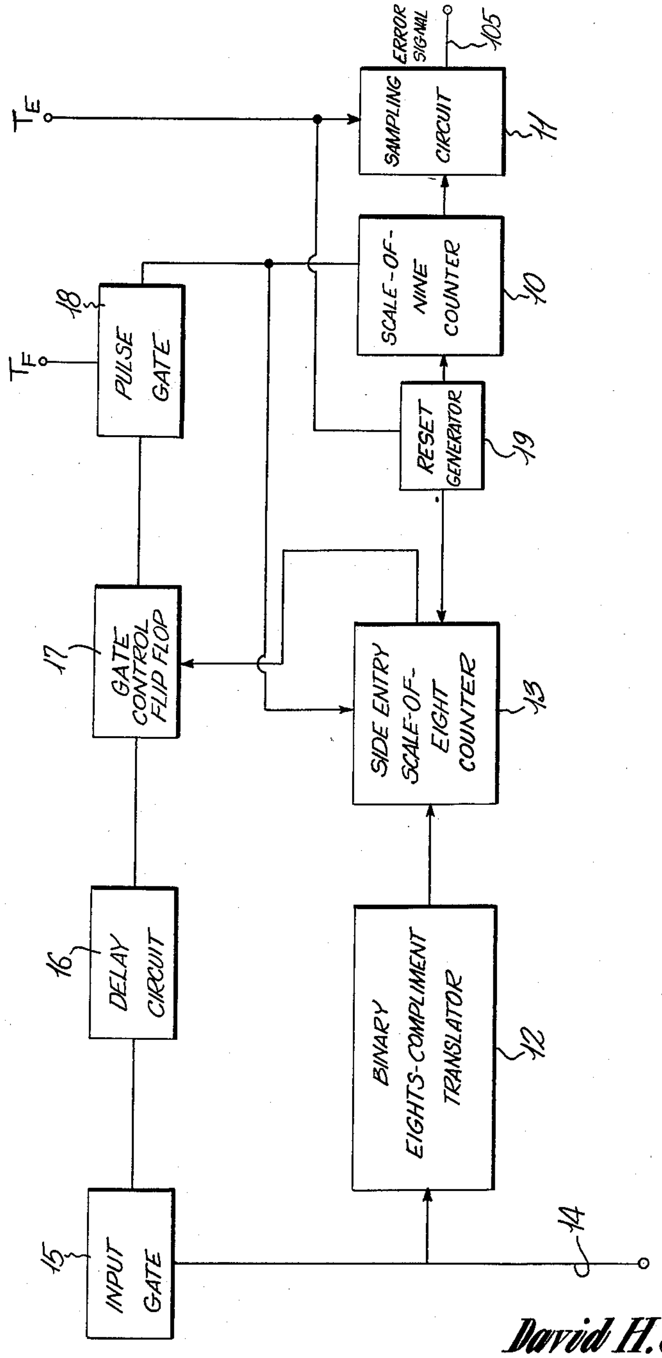
FIGURE 1 is a block diagram of the serial number checking apparatus embodying the present invention.

The apparatus of the present invention is a device designed for use with automatic character sensing apparatus to signal the occurrence of a reading error in the character sensing apparatus when pre-arranged identification and like numbers are being read. The numbers to be read by the character sensing apparatus in the present checking scheme may be account numbers, serial numbers, invoice numbers and other identification numbers, which are especially prepared for use with this scheme by providing an additional digit, termed a checking digit which, when added to the total of the other digits in the identification number, will produce a sum which is an integral multiple of the modulus of the system.

Essentially, the apparatus consists of a counting ring which completes its cycle of operation in a given number of electrical pulses or like signals. The number of pulses required for a complete cycle is called the modulus. The identification numbers are pre-arranged by the addition of the check digit so that the sum of all the digits in the number is equal to a whole multiple of the counter modulus. When the identification number is read by automatic character sensing apparatus, the counter is advanced by a number of pulses equal to each digit of the number. When the number has been completely read, the counter will have been advanced through one or more complete cycles if each digit in the number was correctly read. For the production of the error signal, means are provided for sampling the condition of the counter at the completion of reading of the number to detect whether it has gone through one or more complete cycles and produce an error signal in response to the counter condition if the counter is left standing on an incomplete cycle.

Theoretically, any number can be used as the modulus for this checking system. In practice, however, certain numbers are much more convenient than others and facilitate significant simplification of the checking apparatus. It is preferable to limit the checking number to a minimum number of digits, thereby limiting the choice of a modulus in a practical sense, to the numbers 1–10. If 10 is chosen for the modulus, the pre-arrangement of the checking digit becomes somewhat complicated, as the check digits to accompany a given series of identification numbers do not form a simple series and in practice must be calculated for each number.

The choice of 9 for the counter modulus greatly simplifies preparation of check digits. With a modulus of 9, once the check digit for the first number of a series of identification numbers has been calculated, the check digits for the remainder of the series can readily be assigned, since they form a repeating series; i.e., 8, 7, 6, 5, 4, 3, 2, 1, 0, 8, 7, 6, 5, etc.

This property of the check digits in a modulus 9 system makes it possible to print checking identification numbers with only slight modification of conventional automatic numbering machines. This may be accomplished by adding to an automatic numbering machine a 9-position wheel containing the digits 8, 7, 6, 5, 4, 3, 2, 1, 0, which 9-position wheel steps with the 10-position wheel. This renders the sum of all of the digits of imprinted numbers a multiple of the modulus 9. The starting identification number for the series may be set up in the numbering machine normally used for such purposes and the corresponding check digit calculated by adding the digits in the starting identification number and subtracting from the next highest multiple of 9. When this digit is set up on the check digit numbering machine, the correct check digit for subsequent identification numbers in the series will be printed automatically, thereby eliminating the necessity for further individual calculation of the check digit.

The following is a comparison chart of check digits for modulus 9 and modulus 10, which illustrates the interruptions in the series of check digits produced for modulus 10:

| Identification Number | Modulus 9 Check Digit | Digit Total | Modulus 10 Check Digit | Digit Total |
|---|---|---|---|---|
| 12345 | 3 | 18 | 5 | 20 |
| 12346 | 2 | 18 | 4 | 20 |
| 12347 | 1 | 18 | 3 | 20 |
| 12348 | 0 | 18 | 2 | 20 |
| 12349 | 8 | 27 | 1 | 20 |
| 12350 | 7 | 18 | 9 | 20 |
| 12351 | 6 | 18 | 8 | 20 |
| 12352 | 5 | 18 | 7 | 20 |
| 12353 | 4 | 18 | 6 | 20 |
| 12354 | 3 | 18 | 5 | 20 |
| 12355 | 2 | 18 | 4 | 20 |
| 12356 | 1 | 18 | 3 | 20 |
| 12357 | 0 | 18 | 2 | 20 |
| 12358 | 8 | 27 | 1 | 20 |
| 12359 | 7 | 27 | 0 | 20 |
| 12360 | 6 | 18 | 8 | 20 |
| 12361 | 5 | 18 | 7 | 20 |
| 12362 | 4 | 18 | 6 | 20 |

There is a slight inherent disadvantage in using the modulus 9, as the counter cannot detect a reading error in which zero is mistaken for 9 or vice versa, because the modulus 9 counter will stand for the same count before and after receiving either a zero or a 9 signal. However, this inability of the checking apparatus to detect zero or 9 errors can be overcome by programming the character sensing equipment with which it is associated to increase its own reliability of discrimination between these two digits.

The general nature of the invention will be understood from the block diagram of FIGURE 1. Essentially, the serial number checking apparatus of the present invention is a pulse counter, indicated by reference character 10, counting to the scale of 9. It is advanced by a number of pulses equal to the numeric value of each digit in the identification number. When reading of the identification serial number by the character sensing apparatus with which the checking apparatus is associated has been completed, the condition of the pulse counter is sampled by a sampling circuit 11 responsive to the condition of the counter 10 and an end-of-number or sampling pulse $T_E$ emitted by the character sensing apparatus. The pulse counter 10 is conditioned to stand on zero if the identification number has been correctly read by the character sensing apparatus. Thus, if the pulse counter 10 is standing on a count other than zero at the time it is sampled, the sampling circuit 11 causes an error signal to be emitted. If the counter 10 stands on zero at the time of sampling, no error signal is emitted.

Control of the scale-of-nine counter 10 is provided by a binary eights complement translator 12 and a side-entry, scale-of-eight counter 13. Inputs from the automatic character sensing apparatus, which are on separate leads individually allocated to the particular digits to be identified, indicated as a group by the reference character 14, are translated into their binary eights complement by the translator 12 and used to set the scale-of-eight counter 13 on the eights complement of the input signal before counting by the scale-of-eight counter begins.

The input pulses from the automatic character sensing apparatus on the leads 14, which always begin coincident with one of the timing pulses $T_F$, preferably produced in the character sensing apparatus, are also fed through an input gate 15 and a delay circuit 16 to a gate control flip-flop 17 which conditions the pulse gate 18 to admit to the counters 10 and 13, or isolate therefrom, timing pulses $T_F$ originating in the character sensing apparatus. The pulse gate 18 therefore serves as switch-means for admitting to the counters 10 and 13 or isolating from the counters the timing pulses $T_F$. In one preferred embodiment of the invention, the timing pulses $T_F$ have a repetition rate of 2400 pulses per second, but should, in any event, have a repetition rate at least 9 times the number of characters per second read by the character sensing apparatus. Incidence of a pulse on any of the input leads 14 will, after a suitable delay introduced by the delay circuit 16, to afford time for the scale-of-eight counter 13 to be set up to the eights complement of the input digit, set the gate control flip-flop 17 which in turn opens the pulse gate 18 and allows the timing pulses $T_F$ to advance both the scale-of-eight counter 13 and scale-of-nine counter 10.

When the scale-of-eight counter 13 reaches the count of eight, it resets the gate control flip-flop 17 to close the pulse gate 18 and terminate the admission of timing pulses $T_F$ to the counters 13 and 10. By presetting the scale-of-eight counter 13 through the binary translator 12 to sit on the eights complement of the digit-identifying pulse on one of the input leads 14 and interrelating the counter 13 and gate control flip-flop 17 so that the gate 18 is open from the time of setting of the counter 13 until it reaches a count of eight, a number of timing pulses $T_F$ equal to the numeric value of the input digit will be admitted to the counters 13 and 10 during the period the gate 18 is open. This cycle of events is repeated for each input digit until the identification number is completely read by the character sensing apparatus, at the completion of which an end-of-number pulse $T_E$ is emitted by the latter to the sampling circuit 11 and a reset generator 19 for sampling the condition of the scale-of-nine counter 10 to emit an error signal if the latter is not standing on zero and reset both counters 13 and 10 for the next identification number.

As heretofore described, the scale-of-nine counter 10 will, during the reading of the identification number by the character sensing apparatus, be advanced through its counts by a number of timing pulses $T_F$ equal to the numeric value of each of the digits including the pre-calculated check digit making up the identification number. Since the check digit is calculated to make the total sum of the digits equal to a whole multiple of the number 9 and the scale-of-nine counter 10 is reset on zero at the beginning of the count of each identification number, the counter 10 will be standing on zero at the conclusion of the count if the number was correctly read by the character sensing apparatus, which conditions the sampling circuit 11 to produce no error signal. If the counter 10 is standing on other than zero, the sampling circuit 11 is conditioned to pass the end-of-number signal $T_E$ producing an error signal.

Figure 2:
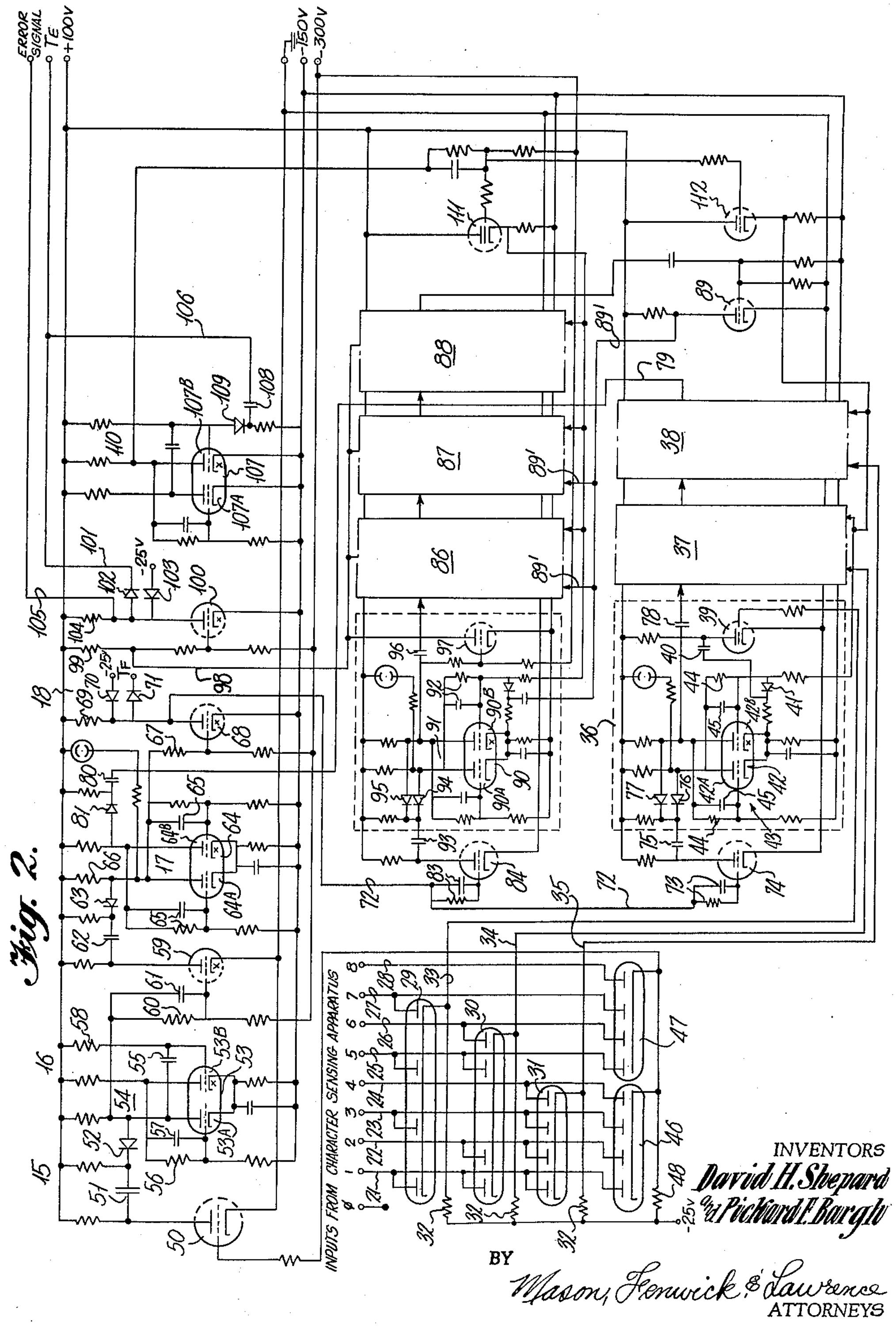
FIGURE 2 is a schematic diagram of the serial number checking apparatus.

The serial number checking apparatus will be more thoroughly understood from the following description in conjunction with the schematic diagram of FIGURE 2. The input signals for the checking apparatus are pulses or positive voltage signals of desired duration present at the character sensing apparatus output terminals, which identify the digit by the terminal on which the signal occurs. These output terminals allocated to the digits 1 to 8, inclusive, are coupled to suitable input terminals associated with leads 21 to 28, respectively, making up the group of leads 14 to apply the pulse or signal indicative of recognition of the digits 1 to 8 to the particular input lead 21 to 28 allocated to that digit. No input leads are provided for the digits zero and 9 since, as previously mentioned, these numbers are not employed in the program of the checking apparatus as the scale-of-nine counter 10 will stand on the same count both before and after receiving either of these digits, thus defeating recognition of an error therein.

The input leads 21 to 28, inclusive, allocated to the digits 1 to 8, identified by the character sensing apparatus, are connected to the plates of three translator OR gates, preferably consisting of type 6AN6, 4-plate common cathode vacuum diodes 29, 30 and 31, the cathode of each of the OR gates being connected to minus 25 volts through 1 megohm resistors 32. The plates of the OR gates 29, 30 and 31 are connected with the input leads 21 to 28 in such a manner that the presence of positive voltages on the output cathode leads 33, 34 and 35 of the OR gates 29, 30 and 31, respectively, when these OR gates are conducting form in effect the binary equivalent eights complement of the digit identified with any of the input lead signals.

The cathode output leads 33, 34 and 35 of the translator OR gates 29, 30 and 31, respectively, supply voltages to set the stages 36, 37 and 38 of the three-stage scale-of-eight side-entry binary counter 13 associated respectively with the leads 33, 34 and 35 when any of the diode sections in the OR gates 29, 30 and 31 are brought to conduction.

The inputs through the leads 21 to 28 to the translator OR gates 29, 30 and 31 are at minus 25 volts in the absence of an input signal. When all of the inputs to any one of the OR gates 29, 30, 31 are at minus 25 volts, the cathode will also be at minus 25 volts. If any one of the input leads 21 to 28 to any of the OR gates 29, 30, 31 is brought to plus 15 volts by an input signal, this being the preferred voltage level of the input signal, the plate connected to that one of the input leads 21 to 28 will cause the diode OR gate to conduct and will raise the cathode voltage level to approximately plus 15 volts. The cathode in this condition will then be positive with respect to the plates connected to the other input leads having no input signals thereon so that the positive signal of plus 15 volts on the cathode will be isolated from the other input leads. The presence of the positive plus 15 volt signal on the OR gate cathode causes the corresponding stage of the scale-of-eight binary counter connected therewith through the leads 33, 34, 35 to be set.

The translation table for the binary eights complement translator is as follows:

| Digit Input | Eights Complement | Binary Equivalent | Scale-of-eight Counter Stages Set | | |
|---|---|---|---|---|---|
| | | | 36 | 37 | 38 |
| 1 | 7 | 111 | X | X | X |
| 2 | 6 | 110 | -------- | X | X |
| 3 | 5 | 101 | X | -------- | X |
| 4 | 4 | 100 | -------- | -------- | X |
| 5 | 3 | 011 | X. | X | -------- |
| 6 | 2 | 010 | -------- | X | -------- |
| 7 | 1 | 001 | X | -------- | -------- |
| 8 | 0 | 000 | -------- | -------- | -------- |

The side-entry scale-of-eight binary counter 13 is formed of three stages 36, 37 and 38 which are identical in construction. An adequate understanding of the detail circuitry of the counter 13 will be afforded, therefore, by a description of the specific circuitry of the first side-entry counter stage 36 associated through the lead 33 with the translator OR gate 29. The positive signals from the cathode of the translator OR gate 29 are connected through the lead 33 to the grid of a triode inverter 39 whose cathode is connected directly to ground and whose plate is connected through a condenser 40 and a 1N34A isolating diode 41 to the grid of the triode section 42B of a dual triode 42 in the flip-flop circuit 43. The plates of both triode sections 42A and 42B are coupled to the grids of the triode sections 42B and 42A, respectively, through resistors 44 and speed-up capacitors 45.

Each of the scale-of-eight binary counter stages 36, 37 and 38 therefore include an inverter triode 39 and a flip-flop circuit 43 including the dual triode 42. It will be seen, therefore, that each of the counter stages 36, 37 and 38 are formed basically of a flip-flop circuit of the balanced trigger circuit type which will remain in a stable condition, with either one of the triode sections 42A, 42B conducting and the other triode section non-conducting, until a negative triggering pulse is applied to the grid of the conducting tube, or until a positive triggering pulse is applied to the grid of the non-conducting tube, to cause a reversal of the circuit conditions. The circuit will then remain quiescent in the new condition of conduction-non-conduction until a suitable pulse is applied to the grid of one of the triode sections, whereupon the circuit will return to its original condition.

The positive signal from the cathode of the translator OR gate 29 coupled through the lead 33 is inverted by the inverter triode 39 and the negative inverter pulse produced in the plate circuit of the triode 39 is coupled through the capacitor 40 and isolating diode 41 to the grid of the triode section 42B of the flip-flop dual triode 42. The negative pulse drives the grid in the section 42B below cut-off, terminating conduction in this section and causing a voltage rise in the plate of the section 42B which is coupled to the grid of the section 42A through the resistor 44 and capacitor 45. This plate voltage rise in the B side of the tube 42 elevates the grid of the section 42A above cut-off, bringing the section 42A into conduction and causing a negative voltage swing on the plate of the section 42A. The lowering of the voltage at the plate of the section 42A coupled to the grid of the section 42B through the resistor 44 capacitor 45 holds the grid of the section 42B below cut-off, thereby setting the counter stage 36.

The flip-flop circuits 43 of the other two scale-of-eight counter stages 37 and 38 are set in like manner by the presence of positive pulses on the cathode output leads 34, 35, respectively, of the translator OR gates 30, 31. In this manner, because of the particular combination of connections of the plates of the translator OR gates 29, 30, 31 with the input leads 21 to 28, the flip-flop circuits 43 of the scale-of-eight counter stages 36, 37 and 38 are triggered to condition the triode sections 42B thereof into a state of non-conduction in accordance with the binary equivalent of the eights complement of the digits represented by the successive input signals appearing on the input leads 21 to 28. The flip-flop circuits of the scale-of-eight counter stations 36, 37, 38 are thereby conditioned to be advanced by advance pulses derived in a manner which will now be described.

The eight input leads 21 to 28 are also connected to the eight plates of a pair of type 6AN6, 4-plate, common cathode vacuum diodes 46, 47 forming the input gate 15, having the cathode connected to minus 25 volts through a 1 megohm resistor 48. Operation of the input gate 15 formed by the two diodes 46, 47 is identical with operation of the translator OR gates 29, 30, 31 previously described. Therefore, a positive signal of, for example, plus 15 volts, on any of the input leads 21 to 28 will appear at the directly connected cathodes of the diodes 46, 47 but will be isolated from the other input leads. The positive signal appearing at the interconnected cathodes of the input gate diodes 46, 47 when a positive signal appears on any of the plates is coupled through the input gate cathode lead 49 to the grid of an inverter triode 50. The negative inverter pulse which is thereupon produced in the plate of the inverter triode 50 is coupled through a 33 mmfd. capacitor 51 and a 1N38A diode 52 to the plate triode section 53A of a dual triode 53 in a single shot multivibrator 54 forming the delay circuit 16. At the time of arrival of a negative inverter pulse on the plate of triode section 53A of the multivibrator 54, the section 53A is in a state of non-conduction and the other triode section 53B is conducting. The negative inverter pulse on the plate of the triode section 53A is coupled through a 220 mmfd. capacitor 55 to the grid of the triode section 53B and drives this grid toward cut-off. The plate of the triode section 53B is directly coupled to the grid of the triode section 53A through a 510K resistor 56 and a 22 mmfd. speed-up capacitor 57. Therefore, lowering of the grid of the triode section 53B in response to the appearance of the negative inverter pulse on the plate of the triode section 53A causes a rise in the plate voltage of the triode section 53B, which raises the grid of triode section 53A above cut-off and brings the section 53A into conduction, causing a further negative swing on the plate of the section 53A which, through the capacitor 55, drives the grid of section 53B down to cut-off conduction in this side.

While the section 53B is cut off, it holds the section 53A in a state of conduction. However, the grid of section 53B will begin to climb toward plus 100 volts as soon as the triode section 53A has reached full conduction. The discharge of the capacitor 55 through the 1 megohm resistor 58 connected between the grid of the section 53B and plus 100 volts, which establishes the time constant of the discharge circuit, will raise the grid of triode section 53B above cut off in approximately 100 microseconds. Once the triode section 53B begins to conduct, the intercoupling between its plate and the grid of section 53A causes the reducing plate voltage in the section 53B to drive section 53A toward cut-off. As the section 53B is driven toward cut-off, it drives the section 53B further into conduction until the section 53B is conducting fully and section 53A is again cut off.

The plate of triode section 53A of the multivibrator 54 is connected to the grid of inverter triode 59 through a 330K resistor 60 and 22 mmfd. speed-up capacitor 61. As the delay multivibrator 54 goes through its cycle of operation, a negative pulse of approximately 100 microseconds' duration is delivered from the plate of the triode section 53A to the grid of the inverter triode 59. The plate of the inverter triode 59 delivers a positive pulse of like duration through a capacitor 62 and 1N38A isolating diode 63 to the plate of triode section 64A of a dual triode 64 in the flip-flop circuit 17, which triode section 64A is normally non-conducting. The positive edge of this pulse is isolated from the dual triode 64 by the 1N38A diode 63. The negative swing or trailing edge of this pulse, which occurs approximately 100 microseconds after the leading edge, does reach the plate of the triode section 64A and is coupled to the grid of the triode section 64B through one of the resistor-capacitor networks 65 interconnecting the grids of the triode section 64A, 64B with the plates of the section, 64B, 64A, respectively. The negative swing of this pulse sets the gate control flip-flop 17 by triggering this balanced trigger circuit to place the triode section 64B in a state of non-conduction and the triode section 64A in a state of conduction. Due to the delay introduced by the delay stage 16, this setting of the gate control flip-flop 17 to place the triode section 64A in a state of conduction occurs approximately 100 microseconds after the input signals on the leads 21 to 28 set up the scale-of-eight counter 13.

The plate of triode section 64A of the gate control flip-flop 17 is connected through a resistor 66 to a source of plus 100 volts and through a resistor 67 to the grid of a triode inverter 68. The plate of the triode inverter 68 is connected through a resistor 69 to plus 100 volts, through 1N34A diode 70 to a source of minus 25 volts, and through a 1N34A diode 71 to a source of timing signals $T_F$ of plus 15 volts having, in the preferred embodiment, a repetition rate of 2400 pulses per second and a duration of 30 microseconds. The inverter triode 68 and the diodes 70 and 71 form the pulse gate 18. The voltage level at the terminal from which the timing signals $T_F$ are derived is minus 25 volts between signals. The plate of the triode inverter 68 is also connected through the leads 72 and a resistor-capacitor network 73 to the grid of an inverter triode 74 whose plate is coupled through 33 mmfd. capacitor 75 and two 1N38A diodes 76 and 77 to the plates of triode sections 42A and 42B of the flip-flop circuit 43 in the first scale-of-eight counter stage 36.

When triode section 64A of the gate control flip-flop 17 is conducting, the triode inverter 68 is cut off and its plate tries to go to plus 100 volts. However, between the occurrence of the timing pulses $T_F$, the lead through which the timing pulses are coupled to the diode 71 is at minus 25 volts and the plate of the triode inverter 78 is held at minus 25 volts. When a timing pulse $T_F$ occurs, the rise to plus 15 volts is coupled through the diode 71 to the plate of the triode inverter 68. Since the triode inverter 68 is also connected through the lead 72 to the counter input inverter 74 for the scale-of-eight counter stage 36, the timing pulses $T_F$ will be applied to the plate of the triode section 42A of the scale-of-eight counter stage 36.

The counter input inverter 74 provides negative inverter pulses at its plate upon occurrence of the timing pulses $T_F$ on its grid which are coupled through the capacitor 75 and the two 1N38A diodes 76, 77 to the plates of both triode sections 42A and 42B of the first scale-of-eight counter 36. When this negative pulse, which is termed an advance pulse, is coupled through the capacitor 75, it will be virtually isolated from the conducting plate of the dual triode 42 and the non-conducting grid thereof because the plate will hold the anode of the associated IN38A diodes 76, 77 below its cathode potential until the negative pulse has brought the diode cathode down to the potential of the plate of that triode section of the tube 42 which is conducting. Any portion of the negative pulse which does reach the non-conducting grid of the tube 42 only attempts to drive more negative the grid which is already below cut off.

The negative inverter pulse will appear, however, on the plate of the non-conducting triode section and be coupled to the grid of the conducting section by the intercoupling resistor 44 and capacitor 45. This negative pulse will drive the grid of the conducting section toward cut-off, causing a plate voltage rise in that section, which plate voltage rise is coupled to the grid of the non-conducting section to drive the grid of the non-conducting section above cut-off. As soon as the formerly non-conducting section begins to conduct, its falling plate voltage will cut off the formerly conducting section and hold that section in a state of non-conduction. As the formerly conducting section comes out of conduction, its rising plate voltage will hold the formerly non-conducting side in conduction and a new state of equilibrium will be reached. If the negative advance pulse is of sufficient amplitude to cause the non-conducting section of the tube 42A to be brought into conduction, the action of the two sections of the tube 42 on each other will cause the two sections to exchange conduction.

The plate of the section 42B in the first counter stage 36 and the second counter stage 37 is coupled through a 33 mmfd. coupling capacitor 78 to the cathode side of the 1N38A diodes 76 and 77, forming the inputs to the plates of the dual triode 42 of the scale-of-eight counter stages 37 and 38, respectively. Consequently, when the section 42B of the flip-flop tube 42 in the preceding scale-of-eight counter stage which is normally conducting, is cut off, its positive plate swing is coupled through the coupling capacitor 78 to the next counter stage. The positive swing does not affect the condition of the next stage, since it is isolated from both plates of the next stage by the two diodes 76 and 77. However, when the section 42B of the counter stage 36 or 37 is triggered into conduction, its negative plate swing is coupled to the following counter stage 37 or 38 and causes the stage 37 or 38 to advance in the same manner that the stage 36 is advanced by the occurrence of negative inverter pulses at the plate of the counter input inverter 74. Thus, the first scale-of-eight counter stage 36 will flip on every advance pulse produced at the plate of the input inverter 74. The second stage 37 will flip every time triode section 42B of the first counter stage 36 comes into conduction, which will be on every second advance pulse. The third scale-of-eight counter stage 38 will flip every time the triode section 42B of the second counter stage 37 comes into conduction, or every fourth advance pulse. If the scale-of-eight counter 13 is standing on zero, in which state all of the triode sections 42B of the stages 36, 37 and 38 are conducting, eight advance pulses will be required to make the scale-of-eight counter 13 go through a complete counting cycle. On the fourth advance pulse, the flip-flop circuit 43 of the third scale-of-eight counter stage 38 will produce a positive pulse on the plate of the triode section 42B thereof, which will be transmitted through the output lead 79 connected from the plate of the triode section 42B of counter stage 38 through the coupling capacitor 80 and 1N38A diode 81 to the plate of triode section 64B of the gate control flip-flop 17. This positive pulse, however, will not affect the condition of the pulse gate inverter 68. On the eighth advance pulse, however, a negative pulse will be produced at the plate of the triode section 42B of counter stage 38, which will be coupled through the output lead 79 to the gate control flip-flop 17, which is coupled through the resistor-capacitor network 65 to the grid of the conducting triode section 64A of the gate control flip-flop 17 and depress the grid of the conducting triode section 64A toward cut-off to trigger the gate control flip-flop 17 and produce an exchange in conduction conditions in the two triode sections of the tube 64.

The triggering of the gate control flip-flop 17 when the third scale-of-eight counter stage 38 reaches a count of eight, which places the triode section 64A in a state of non-conduction, raises the voltage at the plate of triode section 64A and the grid of pulse gate triode inverter 68 intercoupled therewith to cause the triode 68 to conduct. This terminates the admission of advance pulses from the timing pulse lead $T_F$ as the voltage on the plate of triode 68 when the triode conducts, and therefore, on the cathode of diode 71, isolates the plus 15 v. timing pulses $T_F$ from the lead 72.

Thus, when the scale-of-eight counter stages 36, 37 and 38 are set up in accordance with the binary equivalent of the eights complement of the input digit by the voltages on the side entry leads 33, 34 and 35 from the translator OR gates 29, 30 and 31, the scale-of-eight counter input stage 36 must be triggered by the number of advance pulses equal to the numeric value of the input digit before the triode section 42B of the last counter stage 38 is conditioned to trigger the gate control flip-flop 17 to close the pulse gate 18 for timing pulses $T_F$ by bringing the pulse gate triode inverter 68 into conduction. A number of timing pulses $T_F$ equal to the numeric value of the input digit are thereby made available on the lead 72.

The positive timing pulses $T_F$ gated through the pulse gate 18 to the lead 72 are also coupled through the resistor-capacitor coupling network 83 to the grid of a counter input inverter triode 84, which is identical to the counter input inverter 74, producing a negative inverter advance pulse at the plate of triode 84 for advancing the count of the scale-of-nine counter 10. The scale-of-nine counter 10 is a four-stage binary counter modified by the pulse feedback circuits so that it completes its cycle of operations in nine advance pulses instead of sixteen, as would normally be expected of a four-stage binary counter, and consists of four flip-flop stages 85, 86, 87 and 88 and a feedback inverter stage 89.

The circuitry of the stages 85, 86, 87 and 88 of the scale-of-nine counter 10 is identical and is substantially the same as that of the scale-of-eight counter stages 36, 37 and 38. Each scale-of-nine counter stage 85, 86, 87 and 88 comprises a dual triode tube 90 forming a flip-flop circuit 91, the plates of triode sections 90A and 90B being coupled with the grids of sections 90B and 90A, respectively, through resistor-capacitor networks 92. The plate of the counter input inverter 84 is coupled through capacitor 93 and two 1N38A isolating diodes 94 and 95 to both plates of the flip-flop tube 90 of the first counter stage 85. The plate of the triode section 90B of each counter stage 85, 86 and 87 is coupled through a capacitor 96 to the cathode end of 1N38A isolating diodes 94, 95 of the succeeding stages 86, 87 and 88, respectively, to trigger the succeeding stages.

When the pulse gate 18 opens upon cutting off of the pulse gate inverter 68, the positive timing pulses $T_F$ fed to the counter input inverter 84 are inverted and the negative advance pulses at its plate cause the scale-of-nine counter 10 to advance in the same manner as the operation of the scale-of-eight counter 13, the negative advance pulses triggering the grid of the conducting triode section of flip-flop tube 90 of stage 85 to reverse the conduction, non-conduction conditions of the triode sections 90A and 90B, and the negative pulses at the plate of each triode section 90B of each stage as that section goes into conduction, being coupled to the isolating diodes 94, 95 of the succeeding stages 86, 87 and 88 to trigger the grid of the conducting triode section of those stages to reverse the conduction, non-conduction conditions in those stages.

By this arrangement, the first stage 85 of the scale-of-nine counter 10 will flip on every advance pulse, the second stage 86 will flip on every second advance pulse, the third stage 87 will flip on every fourth pulse, and the fourth stage 88 would normally flip on every eighth pulse. However, the grid of the feedback inverter triode 89 is coupled to the plate of triode section 90B of the fourth counter stage 88 so that the positive plate swing of this section 90B of stage 88 as this plate goes out of conduction when the counter 10 receives the eighth advance pulse from lead 72, is applied to the grid of inverter 89. The feedback inverter 89 is normally biased below cut-off and this positive swing on its grid will produce a negative pulse at its plate which is coupled through the lead 89′, a coupling capacitor and a 1N34A isolating diode to the grids of triode sections 90B of the counter stages 85, 86 and 87. When the triode section 90B of stages 85, 86 and 87 will have just come into conduction. However, the negative feedback pulse produced at the plate of feedback inverter 89 and coupled to the grids of sections 90B of counter stages 85, 86 and 87 will cut off these sections 90B and brings the opposite sections 90A of these stages into conduction. Thus, the eighth advance pulse which produces the feedback pulse at the plate of the inverter 89 when the section 90B of the fourth counter stage 88 goes out of conduction causes the scale-of-nine counter 10 to advance from binary seven to binary fifteen because of the feedback circuit. The next successive advance pulse on the lead 72, which will be the ninth advance pulse, will advance the scale-of-nine counter 10 to zero again. The cycle of operation of the scale-of-nine counter 10 is reproduced in chart form below:

| Event | Counter Stages Conducting | | | | | | | | Binary Count | Decimal Equivalent |
|---|---|---|---|---|---|---|---|---|---|---|
| | 85 | | 86 | | 87 | | 88 | | | |
| | A | B | A | B | A | B | A | B | | |
| Reset | ---- | X | ---- | X | ---- | X | ---- | X | 0000 | 0 |
| 1st Pulse | X | ---- | ---- | X | ---- | X | ---- | X | 0001 | 1 |
| 2nd Pulse | ---- | X | X | ---- | ---- | X | ---- | X | 0010 | 2 |
| 3rd Pulse | X | ---- | X | ---- | ---- | X | ---- | X | 0011 | 3 |
| 4th Pulse | ---- | X | ---- | X | X | ---- | ---- | X | 0100 | 4 |
| 5th Pulse | X | ---- | ---- | X | X | ---- | ---- | X | 0101 | 5 |
| 6th Pulse | ---- | X | X | ---- | X | ---- | ---- | X | 0110 | 6 |
| 7th Pulse | X | ---- | X | ---- | X | ---- | ---- | X | 0111 | 7 |
| 8th Pulse | ---- | X | ---- | X | ---- | X | X | ---- | 1000 | 8 |
| Feedback | X | ---- | X | ---- | X | ---- | X | ---- | 1111 | 15 |
| 9th Pulse | ---- | X | ---- | X | ---- | X | ---- | X | 0000 | 0 |
| 10th Pulse | X | ---- | ---- | X | ---- | X | ---- | X | 0001 | 1 |
| 11th Pulse | ---- | X | X | ---- | ---- | X | ---- | X | 0010 | 2 |

If the scale-of-nine counter 10 is standing on zero at the beginning of a count and it receives nine advance pulses from the counter input inverter 84, it will go through a complete counting cycle and again stand on zero. If the total of the digits read by the character sensing equipment is equal to a whole multiple of nine, the counter 10 will have received a number of advance pulses from the counter input inverter 84 which is a multiple of nine annd will therefore be standing on zero. Since the identification numbers for use with this apparatus are arranged to meet this condition, the fact that the counter 10 stands on zero after completion of reading of the number is an indication that the number has been read without error.

The error signal sampling circuit 11 is provided to determine the condition of the scale-of-nine counter 10 at the completion of the reading of a number and emit an error signal if the counter 10 does not stand on zero or suppress the error signal if the counter 10 does stand on zero. A triode 97, which may be a separate triode but in the preferred embodiment illustrated is merely a triode section of a dual triode tube, is associated with each counter stage 85, 86, 87 and 88 of the scale-of-nine counter 10, the grids of these triodes 97 being resistance coupled to the plate of flip-flop triode section 90B of its associated scale-of-nine counter stage. The plates of these four triodes 97 are connected through lead 98 and a common 33K load resistor 99 to plus 100 volts. The triodes 97 and their common load form an AND gate. If the triode section 90B of any scale-of-nine counter stage 85, 86, 87, 88 is conducting, the reduced plate voltage of the triode section 90B on the grid of the AND gate triode 97 will cut off the associated triode 97. If a counter stage section 90B is not conducting, its associated AND gate triode 97 will conduct. The plate lead 98 of the AND gate triodes 97 is also resistance coupled to the grid of a triode inverter 100. If one or more of the AND gate triodes 97 is conducting due to non-conduction of the associated flip-flop section 90B, sufficient current will be drawn through the load resistor 99 to cut off the inverter 100. If all of the counter stage sections 90B are conducting (counter 10 standing on zero) and their associated AND gate triodes 97 are cut off, the inverter 100 will conduct.

When reading of the identification number has been completed, the character sensing apparatus emits the end-of-number pulse $T_E$ of plus 15 volts rising from a normal level of minus 25 volts which appears at the $T_E$ lead terminal 101 coupled to the plate of triode inverter 100 through the 1N34A diode 102. The plate of triode 100 is also coupled to minus 25 volts through 1N34A diode 103 and to plus 100 volts through resistor 104.

When triode 100 is conducting, its plate attempts to go below minus 25 volts but is clamped to minus 25 volts by diode 103. Any end-of-number pulse $T_E$ which occurs while triode 100 is conducting will be isolated from its plate and from the error signal lead 105 extending from the plate of triode 100 by the diode 102 whose anode is then at minus 25 volts. When triode 100 is cut off, its plate attempts to go to plus 100 volts, but the plate is held to minus 25 volts between end-of-number pulses $T_E$ by the minus 25 volts normal level of the $T_E$ lead 101 and the coupling diode. If the end-of-number pulse $T_E$ occurs when triode 100 is cut off, its plate will rise to plus 15 volts for the duration of the $T_E$ pulse. This plus 15 volt pulse will then appear on the error signal lead 105. Thus, an error signal is produced on the lead 105 at each $T_E$ pulse if the scale-of-nine counter 10 is not standing on zero.

The end-of-number pulse $T_E$ also initiates reset of both the scale-of-eight counter 13 and the scale-of-nine counter 10. The $T_E$ pulse is coupled through lead 106 to the grid of triode section 107B of a dual triode tube 107 through capacitor 108 and isolating diode 109. The dual triode 107 is connected as a single shot multivibrator circuit 110 forming the reset generator 19. The section 107B of the multivibrator 110 is normally conducting, so the positive swing of the $T_E$ pulse does not effect its operation. The negative swing at the end or trailing edge of the $T_E$ pulse causes the multivibrator 110 to go through its cycle of operation similar to that of delay multivibrator 54. The duration of the positive pulse on the plate of section 107B is approximately 40 microseconds.

The positive pulse from the section 107B of the reset generator 19 is coupled to the grids of cathode follower reset amplifiers 111, 112, whose cathodes are coupled to the grids of sections 90B and 42B of all stages of the counters 10 and 13, respectively. The reset pulse brings the sections 90B and 42B of the two counters 10 and 13 into conduction and holds them in conduction long enough to allow any advance pulses which may be propagated by the reset to subside. When the reset pulse terminates, the sections 90B and 42B of all counter stages will be conducting.

The detailed operation of the instant serial number checking apparatus will be clearly understood to persons skilled in the art to which this invention pertains in view of the foregoing description of the operation of the component circuits making up the apparatus and the general knowledge of persons skilled in this art regarding the characteristics of such components and parts. This understanding will be furthered by the following brief description of the operation with one exemplary serial number. Assuming the serial number 123453 is being read by the character sensing apparatus, the digit 3 being the pre-arranged check digit imprinted with the serial number to produce a total digit sum equal to a whole multiple of 9, the input signal supplied to the serial number checking apparatus from the character sensing apparatus upon recognition of the first digit 1 will be applied to the input lead 21.

In the preferred embodiment, all input, timing, sampling and output signals will be at plus 15 volts for the duration of the signal and at minus 25 volts between signals. As will be apparent from the accompanying drawing, the input signal on the input lead 21 will cause each of the translator OR gates 29, 30 and 31 to conduct since each of these gates has a plate connected to the input lead 21. A positive voltage will thereupon appear at the cathode leads 33, 34 and 35 of the gates 29, 30 and 31 which, being connected to each of the scale-of-eight counter stages 36, 37 and 38, will set all of these stages, causing the triode section 42B thereof to become cut off. The input signal on the lead 21 also causes the input gate diode 46 to conduct, producing a positive voltage on its cathode lead 49 which is inverted by the triode inverter 50 and applied through the capacitor 51 and isolating diode 52 to the plate of section 53A of the single shot delay multivibrator 54 of the delay circuit 16, and through the capacitor 55 to the grid of section 53B thereof to trigger the single shot mutlivibrator 54. The 100 microsecond pulse produced at the plate of section 53A is inverted by the triode inverter 59 and applied to the plate of section 64A of the gate control flip-flop 17. The negative swing or trailing edge of the 100 microsecond positive pulse at the plate of the inverter 59 produced from the 100 microsecond negative pulse from the plate of the delay triode section 53A triggers the gate control flip-flop 17 to open the pulse gate in the plate circuit of the pulse gate triode 68 through the isolating diode 71 and admit the next timing signals $T_F$ through the lead 72 to the grids of the counter input triodes 74 and 84. The negative pulse produced at the plate of the scale-of-eight input counter triode 74 upon occurrence of the timing pulse $T_F$ on its grid is applied to the plates of the triode sections 42A and 42B of the first scale-of-eight counter flip-flop stage 36 to trigger the stage 36 and below cut off, bringing section 42B of stage 37 into conduction. Since the plate of each triode section 42B is connected to the grid of the section 42A of the next succeeding scale-of-eight counter stage, the negative plate pulse produced when section 42B of counter stage 36 comes into conduction drives section 42A of stage 37 below cut off, bringing section 42B of stage 37 into conduction. In like manner, this triggers the flip-flop of the last scale-of-eight counter stage 38, bringing triode section 42B of stage 38 into conduction. This, applied to the plate of section 64B of the gate control flip-flop 17 hrough the lead 79, capacitor 80 and diode 81, triggers the gate control flip-flop 17 and cuts off the pulse gate 18 to terminate gating of timing pulses $T_F$ to the counters 10 and 13. In this manner, only one timing pulse $T_F$, which corresponds to the numeric value of the input signal on the input lead 21, is applied to the input triode 84 of the scale-of-nine counter 10. This single timing pulse $T_F$ therefore actuates the flip-flop 91 in the first stage 85 of the scale-of-nine counter 10 to go through one count.

The next input signal identifying recognition by the character sensing apparatus of the digit 2 appears on the input lead 22 and causes only the translator OR gates 30 and 31 to conduct, thereby setting only the scale-of-eight counter stages 37 and 38. After the 100 microsecond delay interposed by the circuit 16, the gate control flip-flop 17 is triggered to open the pulse gate in the plate circuit of the pulse gate triode 68, allowing timing pulses $T_F$ to be applied to the counter input triodes 74 and 81 of the counters 13 and 10, respectively. When the scale-of-eight counter 13 has been actuated through a count of two, the stages of the scale-of-eight counter having been set in accordance with the binary eights complement equivalent of the digit 2, the plate of section 42B of the last scale-of-eight counter stage 38 will be brought into conduction, closing the pulse gate 18. The scale-of-nine counter 10 has, therefore, been supplied with two more advance pulses, advancing the count of the scale-of-nine counter 10 through two more counts. In like manner, the appearance of input signals representing the digits 3, 4, 5 and 3 on the input leads 23, 24, 25 and 23, respectively, actuate the scale-of-eight counter 13 to open the pulse gate 18 for an appropriate period to admit the number of timing pulses $T_F$ to the scale-of-nine counter 10 equal to the numeric value of the digits represented by the input signals.

When the second timing pulse $T_F$ is supplied to the scale-of-nine counter 10 following the appearance of an input signal on the input lead 24, the triode section 90B of the fourth counter stage 88 is cut off, producing a positive plate pulse. The positive plate swing of this section 90B of counter stage 88 produces a negative pulse at the plate of the feedback inverter 89 which is applied to the grids of the triode sections 40B of the counter stages 85, 86 and 87 which immediately cuts off these sections, causing the scale-of-nine counter 10 to advance from binary seven to binary fifteen. The next successive advance pulse $T_F$ applied to the scale-of-nine counter 10 advances the counter 10 to zero again and the count is continued into a second cycle of operation. Since the input signals appeared on the input leads 21, 22, 23, 24, 25 and 23, the scale-of-nine counter was advanced through a count totaling the second whole multiple of the modulus 9, so that the flip-flop sections 90B of all of the scale-of-nine counter stages 85, 86, 87 and 88 are conducting, thus cutting off their associated AND gate triodes 97, causing the inverter 100 to conduct. This causes any end-of-number pulses $T_E$ occurring while the triode 100 is conducting to be isolated from the error signal lead 105. If the character sensing apparatus had misread any of the digits of the serial number so that, for example, the third digit produced an input signal on the input lead 24 rather than 23, the total count produced in the scale-of-nine counter 10 would be 19, and the flip-flop section 90B of scale-of-nine counter stage 85 would be non-conducting. This causes its associated AND gate triode 97 to conduct, cutting off the inverter 100 and permitting the end-of-number pulse $T_E$ to be coupled from its lead 101 to the error signal 105, thereby indicating that an error was made in the reading of the character sensing apparatus.

The serial number checking apparatus of the present invention can be most advantageously associated with automatic character sensing equipment by providing storage circuits at the output of the character sensing machine for retaining the recognition of digits by the character sensing equipment for a sufficient period of time to permit the serial number checking apparatus to complete its cycle of operation. These storage circuits could, for example, take the form of storage thyratrons having relays in their plate circuit which are energized or conditioned to be energized by triggering of the thyratron into conduction in response to the appearance of a signal on a given output terminal of the character sensing equipment, which stored information is released by closing of the circuit to the storage relay contacts on completion of the circuit to the storage relay coil when the checking apparatus completes its cycle of operation. In this manner the serial number checking apparatus is given an opportunity to check the validity of the character sensing equipment output before the character sensing equipment output is released to the output device or recording mechanism. If the serial number checking apparatus detects an error in reading by the character sensing equipment, the error signal produced on the lead 105 of the character sensing apparatus may be routed to the character sensing equipment to cause it to re-read the identification number or to stop the document feeding apparatus and terminate feeding of number-bearing documents to the character sensing equipment, to reject the document into a separate pocket, or other desired functions.

Such storage circuits in association with the character sensing equipment and the checking apparatus are particularly advantageous in connection with character sensing equipment conditioned to read numbers on documents and actuate a card punch or other output device for recording the number. An example of such an arrangement is illustrated in block diagram form in FIGURE 3. Character sensing apparatus, indicated generally by the reference character 120, which may, for example, be of the type illustrated in U.S. Patent No. 2,663,658 issued to David H. Shepard, and checking apparatus 121 of the type herein disclosed are associated with a document sorter, indicated by the reference character 122. The document sorter 122 is designed for sorting checks and the like having serial numbers imprinted thereon, including a redundant checking digit, as hereinbefore disclosed, and includes a feeding mechanism indicated generally at 123 adapted to feed the documents at high speed through a reading station wherein the character sensing apparatus 120 will sense and interpret the numbers imprinted thereon and a document process mechanism 124 by which the documents are sorted and advanced, discharged or otherwise fed to separate bins or along separate paths, indicated schematically at 125 and 126, whereby the sorted documents can be distinguished from each other. This may be accomplished in any known way, for example, by forming the document process mechanism 124 of a solenoid controlled mechanical gate which, when the solenoid is energized, alters the path along which the documents are fed to transfer documents at the document process mechanism at the time the document process mechanism is actuated to the reject path 126.

Figure 3:
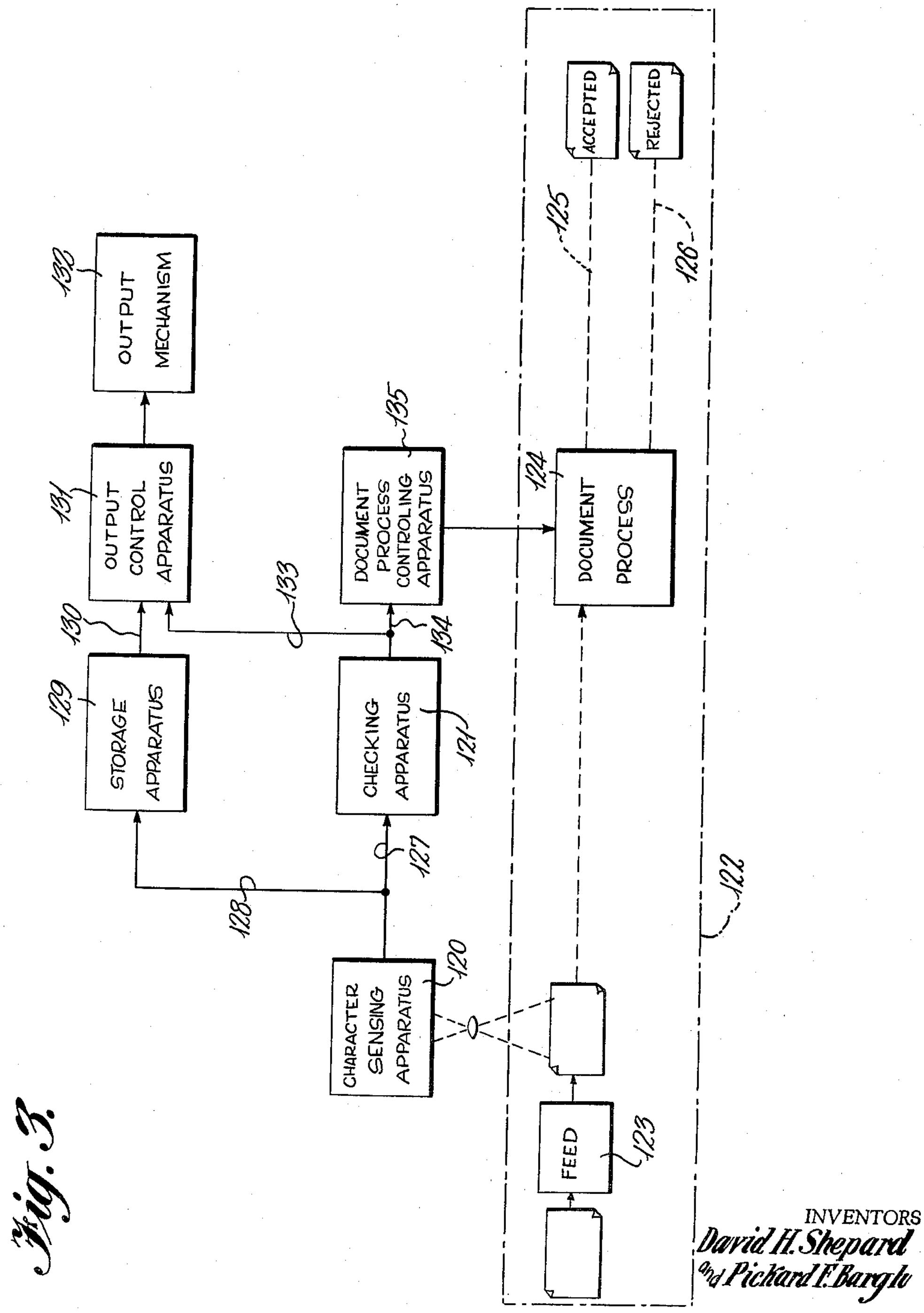
FIGURE 3 is a block diagram illustrating the serial number checking apparatus interconnected with character sensing apparatus, output recording apparatus and document feeding apparatus in accordance with one application of the present invention.

As illustrated in FIGURE 3, the output of the character sensing apparatus is applied along the lead 127 to the checking apparatus 121, whereupon the checking apparatus performs its checking functions as hereinbefore described to determine whether the number read by the character sensing apparatus satisfies the checking formula of the checking apparatus. The output of the character sensing apparatus 120 is also applied along the lead 128 to suitable storage apparatus 129 for storing the identity of the characters or digits read by the character sensing apparatus 120 for the period of time required for the checking apparatus 121 to complete its checking function. The storage apparatus 129 will preferably be formed of thyratron controlled relays of the character just previously described.

The storage apparatus output, which will be released at the same time the checking apparatus 121 releases its indication of whether or not its checking formula is satisfied, is applied along the lead 130 to an output control apparatus 131 for controlling the operation of an output mechanism 132 such as a key punch or the like. The output of the checking apparatus 121 is also applied along the lead 133 to the output control apparatus 131. The function of the output control apparatus 131 is to pass the digit-identifying signals stored by the storage apparatus 129 to the key punch output mechanism 132 if the checking apparatus 121 indicates its checking formula is satisfied by the digits read by the character sensing apparatus, and to isolate the digit-identifying signals from the output mechanism 132 if the checking apparatus 121 indicates that a reading error has been made. The output control apparatus 131 may, for example, comprise a thyratron having a normally closed relay in its plate circuit which has a sufficient number of contacts to dispose a separate contact in each of the digit-identifying output leads of the storage apparatus 129. Additionally, a normally closed relay contact should be disposed in the plate circuit of the thyratron of the output control apparatus 131, which normally closed contact is opened by energization of its relay coil when the card punch or other output device 132 completes its card punching cycle to terminate conduction in the output control apparatus thyratron at the completion of the card punch cycle.

As previously described, the output of the checking apparatus 121 supplied along the lead 133 is normally at minus 25 volts, but is shifted to plus 15 volts when an error signal is produced indicating that the checking formula of the checking apparatus has not been satisfied. Accordingly, the contacts of the thyratron controlled relay of the output control apparatus 131 will normally complete the circuit from the output of the storage apparatus 129 to the key punch or other output mechanism 132 to actuate the output mechanism 132 when the storage apparatus output is released. However, if the checking apparatus 121 emits an error signal along its output lead 133, the thyratron of the output control apparatus 131 will be triggered into conduction, energizing the coil of the plate circuit relay and opening the contacts thereof to prevent application of the digit-identifying storage apparatus output signals to the output mechanism 132.

The output of the checking apparatus 121 is also applied along a lead 134 to document process controlling apparatus 135. The function of the document process controlling apparatus 135 is to control the document process mechanism 124 of the document sorter 122 to separate out the documents for which the checking apparatus 121 indicates a reading error from those documents which the checking apparatus indicates were correctly read by the character sensing apparatus 120. The document process controlling apparatus 135 may take several forms within the scope of persons skilled in this art. For example, the document process controlling apparatus 135 may consist of a flip-flop stage which is triggered by the plus 15 volt error signal produced at the output of the checking apparatus 121 to produce a positive output pulse of sufficient duration to allow the erroneously read document, when it reaches the position of the document process mechanism 124, to be transferred by the mechanical gate to the reject path 126. The positive output pulse of the flip-flop stage would be applied to the grid of a hard tube current amplifier, for example, formed with one triode section of a 5964 tube, having a relay coil in the plate circuit of the hard tube current amplifier whose contacts control the solenoid of the document process mechanism 124. The contacts of the relay in the document process controlling apparatus 135 will be normally open, and would, therefore, be closed to energize the document process solenoid and open the mechanical gate of the document process mechanism 124 only when an error signal occurred at the output of the checking apparatus 121. The document process mechanism 124 of the document sorter 122 would be positioned relative to the reading stage of the document sorter so that the document will be located in position to be transferred to the reject path 126 at the time the checking apparatus 121 completes its checking function and emits an output signal, or the document process mechanism 124 may be located more remote from the document sorter reading stage so long as appropriate delays are incorporated in the document process controlling apparatus output to delay energization of the document process mechanism solenoid until the erroneously read document is in proper position to be transferred by the mechanical gate to the reject path 126.

By this arrangement, the identification of the digits by the character sensing apparatus 120 is stored by the storage apparatus 129 until the checking apparatus 121 completes its checking function, so that at the time of release of the storage apparatus output, the checking apparatus 121 will have had opportunity to produce an error signal which will prevent application of the storage apparatus output to the key punch or other output mechanism 132. Also, the production of an error signal by the checking apparatus 121 will cause the document process controlling apparatus 135 to energize the solenoid of the document process mechanism 124 to transfer the erroneously read document at the time it reaches the document process mechanism 124 to the reject path 126. If no error signal is emitted by the checking apparatus 121, the output of the storage apparatus 129 is applied to the key punch 132 to punch the punch card and the document process mechanism 124 remains unenergized so that the correctly read document will continue along the accepted document path 125. The erroneously read documents are, therefore, sorted out from the correctly read documents so that they can be specially processed.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

We claim:

1. Apparatus for checking the accuracy of readings by automatic character sensing apparatus of a multidigit number, the sum of whose digits equals an integral multiple of a selected numeric modulus, said character sensing apparatus producing output signal pulses each identified with one of the digits read thereby, comprising counter means for advancing in response to electrical pulses through a pulse counting cycle equal to said modulus, a source of advancing pulses for said counter means, gating means for controlling the admission of said advancing pulses to said counter means, means for opening said gating means to admit said advancing pulses in response to occurrence of said output signal pulses, a gate control counter supplied with said advancing pulses admitted through said gating means, and means conditioning said gate control counter in response to input signals derived from said character sensing apparatus upon opening of said gating means to count a number of advancing pulses equal to the numeric value of the digits identified by said input signals and close said gating means upon completion of said count, and means for producing an error signal after completion of the reading of each of said numbers when said first-mentioned counting means terminates counting standing on an incomplete counting cycle.

2. Apparatus for checking the accuracy of readings by automatic character sensing apparatus of a multidigit number, the sum of whose digits equals an integral multiple of the numeric modulus 9, said character sensing apparatus producing output signal pulses each identified with one of the digits read thereby, comprising scale-of-nine counter means for advancing in response to electrical pulses through a pulse counting cycle of nine, a source of advancing pulses for said scale-of-nine counter means, gating means for controlling the admission of said advancing pulses to said scale-of-nine counter means, means for opening said gating means in selected delayed relation to occurrence of said output signal pulses to admit said advancing pulses to said counter means, a binary gate control counter supplied with said advancing pulses admitted through said gating means, translator means responsive to said output signal pulses for setting said binary gate control counter to a selected binary complement of the digit identified with each of said output signal pulses to condition said binary gate control counter to reach a preselected count upon admission thereto of a number of advancing pulses equal to the numeric value of the digits identified with said output signal pulses, means interconnecting said binary gate control counter with said gating means for closing said gating means when said binary gate control counter reaches said preselected count, and means for producing an error signal after completion of the reading of each of said numbers when said scale-of-nine counting means terminates counting standing on an incomplete counting cycle.

3. Apparatus for checking the accuracy of readings by automatic character sensing apparatus of a multidigit number, the sum of whose digits equals an integral multiple of the numeric modulus 9, said character sensing apparatus producing digit-identifying signals, comprising a four-stage binary counter for advancing in response to electrical pulses supplied thereto, feedback means intercoupled with said stages for actuating said stages to shift from binary 7 to binary 15 in response to the eighth pulse supplied thereto after said counter stands on a count of zero to cause said counter to count to the scale of 9, a source of advance pulses for said counter, a three-stage binary counter, gating means for selectively admitting said advance pulses to said counters, means response to the occurrence of said digit-identifying signals for opening said gating means to admit advance pulses to said counters, said three-stage counter closing said gating means when the same reaches the count of eight, means responsive to said digit-identifying signals for setting said three-stage counter upon occurrence of said signals to the binary eights complement of the numeric value of said digit-identifying signals for conditioning said three-stage counter to close said gating means when a number of said advance pulses equal to the numeric value of the digit identified by each digit-identifying signal have been admitted by said gating means to said counters, and sampling means for sampling the condition of all stages of said four-stage counter after completion of the reading of each of said numbers and responsive to selected conduction in any of the stages of said four-stage counter to admit an error signal when said four-stage counter terminates counting with selected stages thereof conducting.

4. Apparatus for checking the accuracy of readings by automatic character sensing apparatus of a multidigit number wherein the sum of the values of the digits comprising a number equals an integral multiple of the numeric modulus 9, said character sensing apparatus producing digit-identifying signals, comprising a four-stage binary counter for advancing in response to electrical pulses supplied thereto, feedback means intercoupled with said stages for actuating said stages to shift from binary 7 to binary 15 in response to the eighth pulse supplied thereto after said counter stands on a count of zero to cause said counter to count to the scale of 9, a source of advance pulses for said counter, a three-stage binary counter, gating means for selectively admitting said advance pulses to said counters, means for opening said gating means in selected delayed relation to occurrence of said digit-identifying signals to admit advance pulses to said counters, said three-stage binary counter closing said gating means when the same reaches the count of eight, translator means responsive to said digit-identifying signals for setting said three-stage binary counter upon occurrence of said signals to the binary eighths complement of the assigned value of the digit identified by each digit-identifying signal to condition said three-stage binary counter to reach the count of eight when a number of said advance pulses equal to the assigned value of the digit identified by each digit-identifying signal have been admitted by said gating means to said counters, sampling means for sampling the condition of all stages of said four-stage binary counter after completion of the reading of each of said numbers including an AND gate coupled to the stages of said four-stage binary counter and to a source of pulses signifying the end of each number read by said character sensing apparatus for passing said end-of-number pulses to produce an error signal when said four-stage binary counter stages are in preselected relative conditions of conduction and reset means for resetting to a count of zero said four-stage binary counter and said three-stage binary counter in preselected delayed relation to the occurrences of each of said end of number pulses.

5. In combination, automatic character sensing apparatus for sensing a multidigit number, the sum of whose digits equals an integral multiple of a selected numeric modulus, identifying the digits of said number, and producing output signals on the appropriate lead of a group of digit-identifying output leads to indicate the digit read, checking apparatus for checking the accuracy of readings of said number by said automatic character sensing apparatus comprising counting means for advancing in response to said output signals through a counting cycle equal to said modulus, means responsive to said character sensing apparatus output signals for supplying a number of advancing signals to said counting means equal to the numeric value of the digits identified by said output signals, means for producing an error signal after completion of the reading of each of said numbers when said counting means terminates counting standing on preselected counts, and storage means for storing said digit-identifying output signals produced by said character sensing apparatus for preselected storage periods following reading of each of said numbers until said checking apparatus completes its checking function.

6. In combination, automatic character sensing apparatus for scanning documents bearing multidigit numbers wherein at least one of said numbers is made self checking by the inclusion of at least one redundant digit for checking purposes arranged to cause the values of the digits comprising a number to satisfy an arithmetical checking formula, said character sensing apparatus reading and identifying the digits scanned and producing output signals indicative of the digits read, checking apparatus for checking the accuracy of readings of said numbers rseponsive to said character sensing apparatus output signals and producing output signals indicative of satisfaction and non-satisfaction of the checking formula by the digits read, storage means for storing the identity of the digits indicated by said character sensing apparatus output signals for preselected storage periods and producing output signals indicative of the digits stored, document processing apparatus for processing number-bearing documents in at least two distinctive ways, document process controlling means responsive to said checking apparatus output signals for altering the processing of said number-bearing documents to distinguish those documents for which the checking apparatus has signalled that the checking formula has been satisfied from those documents for which the checking apparatus has signalled that the checking formula has not been satisfied, and storage output control means responsive to said checking apparatus output signals for releasing to an output device without alteration those of said storage means output signals for which said checking apparatus has signalled that the checking formula has been satisfied and for indicatively altering the release of those of said storage means output signals for which the checking apparatus has signalled that the checking formula has not been satisfied.

7. In combination, automatic character sensing apparatus for scanning documents bearing multidigit numbers wherein at least one of said numbers is made self checking by the inclusion of at least one redundant digit for checking purposes arranged to cause the values of the digits comprising a number to satisfy an arithmetical checking formula, said character sensing apparatus reading and identifying the digits scanned and producing output signals indicative of the digits read, checking apparatus for checking the accuracy of readings of said numbers responsive to said character sensing apparatus output signals and producing output signals indicative of satisfaction and non-satisfaction of the checking formula by the digits read, storage means for storing the identity of the digits indicated by said character sensing apparatus output signals for preselected storage periods and producing output signals indicative of the digits stored, document processing apparatus for processing number-bearing documents in at least two distinctive ways, document process controlling means responsive to said storage output signals for controlling the processing of said number-bearing documents in accordance with said storage means output signals and responsive to said checking apparatus output signals for further controlling the processing of said number-bearing documents to distinguish those documents for which the checking apparatus has signalled that the checking formula has been satisfied from those documents for which the checking apparatus has signalled that the checking formula has not been satisfied.

8. In combination, automatic character sensing apparatus for scanning documents bearing multidigit numbers wherein at least one of said numbers is made self checking by the inclusion of at least one redundant digit for checking purposes arranged to cause the values of the digits comprising a number to satisfy an arithmetical checking formula, said character sensing apparatus reading and identifying the digits scanned and producing output signals indicative of the digits read, checking apparatus for checking the accuracy of readings of said numbers responsive to said character sensing apparatus output signals and producing output signals indicative of satisfaction and non-satisfaction of the checking formula by the digits read, storage means for storing the identity of the digits indicated by said character sensing apparatus output signals for preselected storage periods and producing output signals indicative of the digits stored, and storage output control means responsive to said checking apparatus output signals for releasing to an output device without alteration those of said storage means output signals for which said checking apparatus has signalled that the checking formula has been satisfied and for indicatively altering the release of those of said storage means output signals for which the checking apparatus has signalled that the checking formula has not been satisfied.

9. In combination, automatic character sensing apparatus for scanning documents bearing multidigit numbers wherein at least one of said numbers is made self checking by the inclusion of at least one redundant digit for checking purposes such that the sum of the values of the digits comprising a number is equal to a whole multiple of nine, said character sensing apparatus reading and identifying the digits scanned and producing output signals indicative of the digits read, checking apparatus for checking the accuracy of readings of said numbers responsive to said character sensing apparatus output signals and producing output signals indicative of equality and non-equality of the sum of the values of the digits read to a whole multiple of nine, storage means for storing the identity of the digits indicated by said character sensing apparatus output signals for preselected storage periods and producing output signals indicative of the digits stored, document processing apparatus for processing said number-bearing documents, document process controlling apparatus responsive to said checking apparatus output signals for altering the processing of said number-bearing documents to distinguish those documents for which the checking apparatus has signalled that the sum of the values of the digits read is equal to a whole multiple of nine from those documents for which the checking apparatus has signalled that the sum of the values of the digits read is not equal to a whole multiple of nine, storage output control means responsive to said checking apparatus output signals for releasing to an output device without alteration those of said storage means output signals for which said checking apparatus has signalled that the sum of the values of the digits read is equal to a whole multiple of nine and for indicatively altering the release of those of said storage means output signals for which the checking apparatus has signalled that the sum of the values of the digits read is not equal to a multiple of nine.

10. In combination, automatic character sensing apparatus for scanning documents bearing multidigit numbers wherein at least one of said numbers is made self checking by the inclusion of at least one redundant digit for checking purposes such that the sum of the values of the digits comprising a number is equal to a whole multiple of nine, said character sensing apparatus reading and identifying the digits scanned and producing output signals indicative of the digits read, checking apparatus for checking the accuracy of readings of said numbers responsive to said character sensing apparatus output signals and producing output signals indicative of equality and non-equality of the sum of the values of the digits read to a whole multiple of nine, storage means for storing the identity of the digits indicated by said character sensing apparatus output signals for preselected storage periods and producing output signals indicative of the digits stored, document processing apparatus for processing said number-bearing documents in at least two distinctive ways, document process controlling apparatus responsive to said storage means output signals for controlling the processing of said number-bearing documents in accordance with said storage means output signals and responsive to said checking apparatus output signals for further controlling the processing of said number-bearing documents to distinguish those documents for which the checking apparatus has signalled that the sum of the values of the digits read is equal to a whole multiple of nine from those documents for which the checking apparatus has signalled that the sum of the values of the digits read is not equal to a whole multiple of nine.

11. In combination, automatic character sensing apparatus for scanning documents bearing multidigit numbers wherein at least one of said numbers is made self checking by the inclusion of at least one redundant digit for checking purposes such that the sum of the values of the digits comprising a number is equal to a whole multiple of nine, said character sensing apparatus reading and identifying the digits scanned and producing output signals indicative of the digits read, checking apparatus for checking the accuracy of readings of said numbers responsive to said character sensing apparatus output signals and producing output signals indicative of equality and non-equality of the sum of the values of the digits read to a whole multiple of nine, storage means for storing the identity of the digits indicated by said character sensing apparatus output signals for preselected storage periods and producing output signals indicative of the digits stored, storage output control means responsive to said checking apparatus output signals for releasing to an output device without alteration those of said storage means output signals for which said checking apparatus has signalled that the sum of the values of the digits read is equal to a whole multiple of nine and for indicatively altering the release of those of said storage means output signals for which the checking apparatus has signalled that the sum of the values of the digits read is not equal to a multiple of nine.

12. In combination, automatic character sensing apparatus for scanning documents bearing multidigit numbers wherein at least one of said numbers is made self checking by the inclusion of at least one redundant digit for checking purposes such that the sum of the values of the digits comprising a number is equal to a whole multiple of nine, said character sensing apparatus reading and identifying the digits scanned and producing output signals indicative of the digits read, checking apparatus for checking the accuracy of readings of said numbers responsive to said character sensing apparatus output signals and producing output signals indicative of equality and non-equality of the sum of the values of the digits read to a whole multiple of nine, storage means for storing the identity of the digits indicated by said character sensing apparatus output signals for preselected storage periods and producing output signals indicative of the digits stored, storage output control means responsive to said checking apparatus output signals for releasing to an output device only those of said storage means output signals for which the checking apparatus has signalled that the sum of the values of the digits read is equal to a whole multiple of nine.

13. In combination, automatic character sensing apparatus for sensing a multidigit number containing a redundant verifying digit wherein the sum of the digits of said number equal a whole multiple of a selected numeric modulus, identifying the digits of said number, and producing output signals indicative of the digits read, checking apparatus for checking the accuracy of readings of said number by said automatic character sensing apparatus, storage means for storing said digit-identifying output signals produced by said character sensing apparatus until said checking apparatus completes its checking function, and means for releasing said stored character sensing equipment output to an output device only if said checking apparatus detects that its checking criterion has been satisfied.

14. Apparatus for checking the accuracy of readings by automatic character sensing apparatus of a multidigit number wherein the sum of the digits comprising a number equals an integral multiple of the numeric modulus 9, said character sensing apparatus producing digit-identifying signals, comprising scale-of-nine counter means for advancing in response to advance signals supplied thereto, a source of advance signals for said counter means, control counter means, switching means for selectively admitting said advance signals to said scale-of-nine counter means and said control counter means, means for operating said switching means in selected delayed relation to occurrence of said digit-identifying signals to admit advance signals to said scale-of-nine counter means and said control counter means, means responsive to said digit-identifying signals for conditioning said control counter means to advance through counts equal to the value of the digit identified by each digit-identifying signal, means for operating said switching means to terminate admission of said advance signals to said scale-of-nine counter means and said control counter means when said control counter means has advanced through counts equal to the value of the digit identified by each digit-identifying signal, sampling means for sampling the condition of said scale-of-nine counter means after completion of the reading of each of said numbers and producing an error signal when said counter means are left standing on preselected counts, and reset means for resetting to a count of zero said scale-of-nine counter means and said control counter means in preselected delayed relation to each of said samplings of said scale-of-nine counter means.

15. In combination, automatic character sensing apparatus for scanning documents bearing multidigit numbers wherein at least one of said numbers is made self checking by the inclusion of at least one redundant digit for checking purposes arranged to cause the values of the digits comprising a number to satisfy an arithmetical checking formula, said character sensing apparatus reading and identifying the digits scanned and producing output signals indicative of the digits read, checking apparatus for checking the accuracy of readings of said numbers responsive to said character sensing apparatus output signals and producing output signals indicative of satisfaction and non-satisfaction of the checking formula by the digits read, storage means for storing the identity of the digits indicated by said character sensing apparatus output signals for preselected storage periods and producing output signals indicative of the digits stored, and storage output control means responsive to said checking apparatus output signals for releasing said storage means output signals to an output device only if said checking apparatus detects that its checking criterion has been satisfied.

16. In combination, automatic character sensing apparatus for scanning documents bearing multidigit numbers wherein at least one of said numbers is made self checking by the inclusion of at least one redundant digit for checking purposes such that the sum of the values of the digits comprising a number is equal to a whole multiple of a selected numeric modulus, said character sensing apparatus reading and identifying the digits scanned and producing output signals indicative of the digits read, checking apparatus for checking the accuracy of readings of said numbers responsive to said character sensing apparatus output signals and producing output signals indicative of equality and non-equality of the sum of the values of the digits read to a whole multiple of said numeric modulus, storage means for storing the identity of the digits indicated by said character sensing apparatus output signals for preselected storage periods and producing output signals indicative of the digits stored, document processing apparatus for processing said number-bearing documents in at least two distinctive ways, document process controlling apparatus responsive to said storage means output signals for controlling the processing of said number-bearing documents in accordance with said storage means output signals and responsive to said checking apparatus output signals for further controlling the processing of said number-bearing documents to distinguish those documents for which the checking apparatus has signalled that the sum of the values of the digits read is equal to a whole multiple of said numeric modulus from those documents for which the checking apparatus has signalled that the sum of the values of the digits read is not equal to a whole multiple of said numeric modulus.

17. A nines-checking circuit for a plurality of decimal digits comprising means to establish a pulse train for each digit in said plurality having the same number of pulses as the value of said digit including means to obtain the complement of each digit with respect to the number 8 in the binary-number system, and means to generate a pulse train having a number of pulses equal to the difference between 8 and the complement of said digit, means to count each of said pulse trains in a series sequence, means to recycle said means to count after each count of 9, and means to indicate whether or not said means to count is in a zero-count condition at the end of the count of said pulse trains.

18. A nines-checking circuit for a plurality of decimal digits comprising means to establish a pulse train for each digit in said plurality having the same number of pulses as the value of said number including means to obtain the complement of a digit with respect to the number 8 in the binary-number system, a first binary counter having a total count capacity of 8, means to establish said first binary counter into a count condition representative of said complement, and means to apply pulses to said first binary counter until it is filled, a second counter, means to apply said pulse train for each number in sequence to said counter to be counted, means to recycle said counter whenever it has counted to 9, and means to indicate whether or not said means to count is in a zero-count condition at the end of the count of said pulse trains.

19. A nines-checking circuit for a plurality of decimal digits comprising means to establish a pulse train for each digit in said plurality having the same number of pulses as the value of said digit including means to obtain the complement of each digit in binary form with respect to a selected number, and means to generate a pulse train having a number of pulses equal to the difference between said selected number and the complement of said digit, means to count each of said pulse trains in a series sequence, means to recycle said means to count after each count of nine, and means to indicate whether or not said means to count is in a selected count condition at the end of the count of said pulse trains.

20. A nines-checking circuit for a plurality of decimal digits comprising means to establish a pulse train for each digit in said plurality having the same number of pulses as the value of said number including means to obtain the complement of a digit in binary form with respect to a selected number, a first binary counter having a total count capacity equal to said selected number, means to establish said first binary counter to a count condition representative of said complement, and means to apply pulses to said first binary counter until it is filled, a second counter, means to apply said pulse train for each number in sequence to said counter to be counted, means to recycle said counter whenever it has counted to nine, and means to indicate whether or not said means to count is in a selected count condition at the end of the count of said pulse train.

References Cited in the file of this patent

UNITED STATES PATENTS

| | | |
|---|---|---|
| 2,731,201 | Harper | Jan. 17, 1956 |
| 2,755,022 | Knutsen | July 17, 1956 |
| 2,759,669 | Knutsen | Aug. 21, 1956 |
| 2,765,982 | Knutsen | Oct. 9, 1956 |
| 2,790,600 | Dersch | Apr. 30, 1957 |